(No Model.)
W. B. EDWARDS & G. E. POTTER.
DOUGH MIXER.
No. 569,449. Patented Oct. 13, 1896.
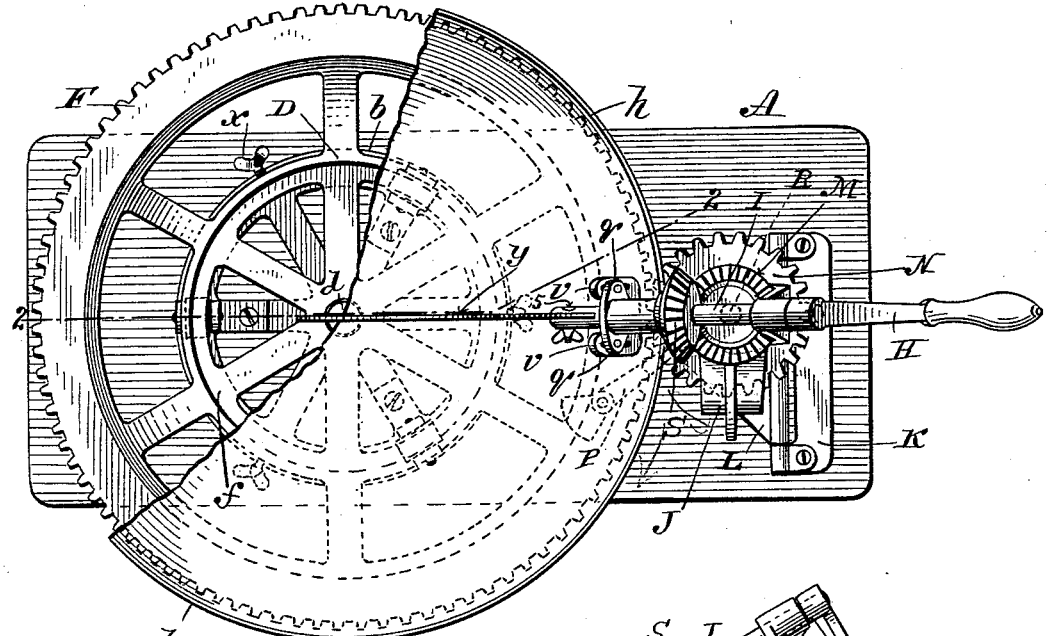
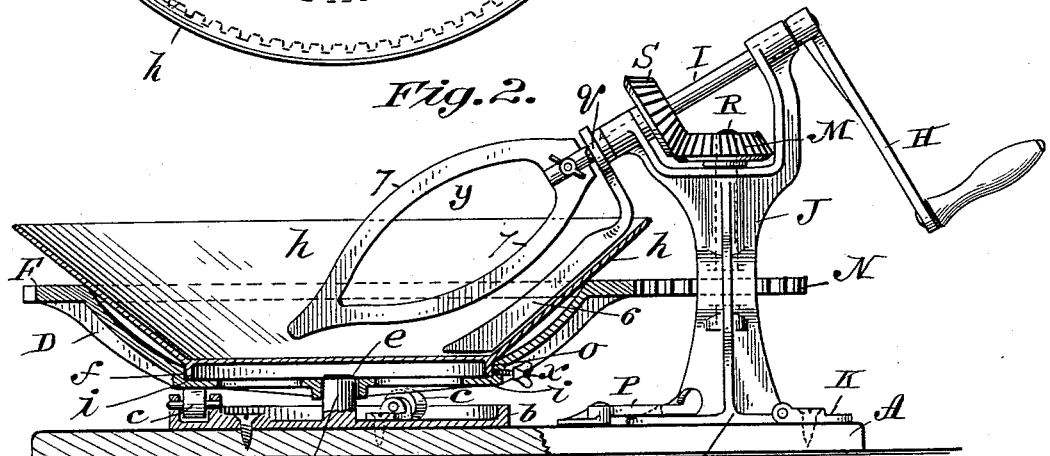
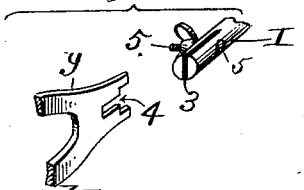
Witnesses:
J. D. Garfield
L. I. Hopkins
Inventors
William B. Edwards,
Georgianna E. Potter,
by Chapman &
Attorneys

UNITED STATES PATENT OFFICE.

WILLIAM B. EDWARDS AND GEORGIANNA E. POTTER, OF HOLYOKE, MASSACHUSETTS.

DOUGH-MIXER.

SPECIFICATION forming part of Letters Patent No. 569,449, dated October 13, 1896.

Application filed September 10, 1895. Serial No. 562,092. (No model.)

*To all whom it may concern:*

Be it known that we, WILLIAM B. EDWARDS and GEORGIANNA E. POTTER, citizens of the United States, residing at Holyoke, in the county of Hampden and State of Massachusetts, have invented new and useful Improvements in Dough-Mixers, of which the following is a specification.

This invention relates to an improved culinary device or apparatus for mixing and stirring the various ingredients for making cake and similar compositions of flour and other matters and for beating eggs, &c., the object being to provide an improved apparatus for said purpose in respect to various details of construction, all as hereinafter fully described, and more particularly pointed out in the claim.

In the drawings forming part of this specification, Figure 1 is a plan view, and Fig. 2 is a side elevation, partly in section, of a cake-stirring and egg-beating device embodying our improvements, said Fig. 1 showing the receiving-pan of the device, partly broken away. Figs. 3 to 6, inclusive, illustrate in perspective views detail parts of the apparatus, which are hereinafter fully described.

In the drawings, A is a supporting-platform, preferably of wood, on which the said apparatus is secured, with all the parts in operative position, as shown in Figs. 1 and 2.

$b$ is a circular metallic bed secured to platform A, as shown, and in which are hung the several supporting-rollers $c$, and is provided with a central stud $d$.

D is a circular metallic pan-receiver having in its base a socket $e$, which receives the upper end of said stud $d$ and which rests upon the said rollers $c$ in the base $b$. The said pan-receiver thus supported is free to rotate on the above-named rollers, and being so supported no perceptible frictional resistance is offered to its rotary movements when operated as below set forth. Said pan-receiver has a circular recess $f$ in the upper side of its base and the border of its uppermost part is in the form of a gear-wheel F, as shown in Fig. 1. A suitable circular track-surface $i$ is formed on the base of the pan-receiver, on which the rollers $c$ bear.

A pan $h$, of sheet metal, preferably, is provided for holding the flour and other substances to be manipulated and stirred by the action of the machine. Said pan is provided with a pending circular flange $o$, which, when the pan is in the pan-receiver D, as shown in Fig. 2, enters said recess $f$ in the receiver D. The pan is temporarily secured to said receiver, so that it will stay therein and rotate with the latter, by one or more thumb or other screws $x$, which are adapted to be screwed against said flange $o$ on the bottom of the pan.

Devices are provided for rotating the pan-receiver and the cake-mixer and for supporting a pan-scraper in proximity to the inner surface of the pan $h$, which devices are constructed and arranged as follows, whereby they are adapted to be swung away from and toward the geared border of the pan-receiver D and whereby said mixer and scraper are at the same time removed from or carried into the pan. A standard J, having a base L, has said base hinged by one edge to a metal plate K, this latter plate being firmly fixed to the platform A by screws or in other suitable manner. The edge of said standard-base L opposite said hinged edge is engaged by a latch P, which is pivoted to swing over the surface of the platform A, said latch holding the standard J in the upright position shown in Figs. 2 and 3. When latch P has its free end swung off from said base L, the standard J may be swung to the right, (looking at Fig. 2,) thereby carrying it and its connected parts away from the receiver D and pan $h$, so that the latter may be conveniently removed from the receiver for cleaning or other purposes and be replaced thereon. The said standard J has the sockets $n\,n$ therein, which constitute bearings for the vertical shaft R, and on this latter-named shaft is fixed the pinion N, which is adapted for engagement with the geared border F of the receiver D. On the upper extremity of said shaft R is fixed the bevel-gear M. A shaft I is adapted to be rotated by crank II, or otherwise, in the bearings $w\,w$ in the standard J. Said shaft I has a bevel-gear S fixed thereon, which engages said gear M on shaft R, and its lower extremity extends more or less over the adjacent borders of the receiver D and pan $h$, as shown in Figs. 1 and 2. A flange $q$ is provided on said standard J. The extremity of said shaft I beyond said flange $q$ has a longitudinal slot 3 therein, (see Fig. 5,) this last-named figure showing in perspective view the slotted end of shaft I and a clamping thumb-screw 5 therethrough.

The cake-mixer $y$ of this apparatus is secured to shaft I and is made preferably of perforated sheet metal having substantially an elliptical contour and a perforation whose borders correspond substantially thereto. The end of said mixer $y$, which is secured to shaft I, as aforesaid, is slotted at 4, Fig. 5, and it enters slot 3 in said shaft astride the clamping-screw 5, as shown in Fig. 4, and is secured in said shaft removably by said screw 5 and its thumb-nut. The above-described mode of making the mixer produces the narrow border-bars 7 7, which render it very effective. The pan-scraper 6 (see Figs. 1, 2, and 6) has a two-armed head $v$, having elongated screw-slots therein, as shown, whereby it is secured to said flange $q$ on standard J and can be adjusted relative to the side of pan $h$, into which the blade thereof extends, as shown in Fig. 2. Said scraper aids materially in the operation of mixing the material in said pan, for it prevents the adhesion of the material to the pan and causes it to be kept in proximity to the mixer $y$.

The operation of the within-described apparatus is quite obvious from the foregoing description.

The ingredients for making cake or other materials which require to be mixed or stirred may be placed in pan $h$ before or after the latter shall have been placed in the receiver D, the pan being secured to the latter, as described, so that it will be rotated when shaft I shall be turned. The mixer $y$, by reason of its peculiar perforated form, when rotated causes the cake material to be divided more or less into portions which pass through the perforation therein. Furthermore, the strip formation of the borders of the mixer renders it peculiarly efficacious in its mixing and stirring action.

To clean the device after using as aforesaid, the latch P is turned from over the base L of standard J, and the latter and the mixer $y$ and scraper 6 are swung upward and entirely away from the pan and the receiver, so that the pan may be easily removed and the said operating parts be easily cleaned.

What we claim as our invention is—

In a dough-mixer, the standard J, hinged at its lower end to the base, having a recess near its center to receive the wheel N, and provided at its upper end with bearings for the shaft I, and having a vertical opening through it to receive the shaft R, combined with the wheels N, M, placed on the shaft R; the mixer-shaft provided with a gear S, and the mixer $y$; and the revolving pan-holder and pan placed therein, substantially as shown and described.

WILLIAM B. EDWARDS.
GEORGIANNA E. POTTER.

Witnesses:
H. A. CHAPIN,
J. W. GARFIELD.